(12) United States Patent
Minase et al.

(10) Patent No.: US 6,992,961 B2
(45) Date of Patent: Jan. 31, 2006

(54) OPTICAL DISK APPARATUS WHICH DETERMINES THE TYPE OF OPTICAL DISK

(75) Inventors: Minoru Minase, Iruma (JP); Hiroyuki Onda, Higashikurume (JP)

(73) Assignee: TEAC Corporation, Tokyo (JP)

( * ) Notice: Subject to any disclaimer, the term of this patent is extended or adjusted under 35 U.S.C. 154(b) by 138 days.

(21) Appl. No.: 10/743,530

(22) Filed: Dec. 22, 2003

(65) Prior Publication Data

US 2004/0130986 A1    Jul. 8, 2004

(30) Foreign Application Priority Data

Dec. 24, 2002 (JP) .............................. 2002-372933

(51) Int. Cl.
*G11B 7/00*    (2006.01)
(52) U.S. Cl. ................. 369/53.23; 369/53.37; 369/124.1
(58) Field of Classification Search ............. 369/53.22, 369/53.23, 53.37, 124.1
See application file for complete search history.

(56) References Cited

U.S. PATENT DOCUMENTS

| | | | | |
|---|---|---|---|---|
| 5,003,521 A | * | 3/1991 | Yoshida et al. .......... | 369/44.25 |
| 5,289,451 A | * | 2/1994 | Ashinuma et al. ....... | 369/47.55 |
| 5,966,357 A | * | 10/1999 | Ryoo ....................... | 369/53.23 |
| 6,249,499 B1 | * | 6/2001 | Andoh ..................... | 369/53.22 |
| 6,272,087 B1 | * | 8/2001 | Hirashima ............... | 369/53.22 |
| 6,493,304 B2 | * | 12/2002 | Watanabe et al. ........ | 369/53.22 |
| 6,744,705 B1 | * | 6/2004 | Sumida et al. ........... | 369/44.11 |
| 6,816,443 B1 | * | 11/2004 | Hwang .................... | 369/44.32 |
| 6,822,936 B2 | * | 11/2004 | Ono et al. ............... | 369/53.23 |
| 6,853,609 B2 | * | 2/2005 | Kusumoto et al. ....... | 369/44.29 |
| 6,879,555 B2 | * | 4/2005 | Takeuchi ................. | 369/53.23 |

FOREIGN PATENT DOCUMENTS

| | | |
|---|---|---|
| JP | 61160838 | 7/1986 |
| JP | 6267181 | 9/1994 |

* cited by examiner

*Primary Examiner*—Paul W. Huber
(74) *Attorney, Agent, or Firm*—Christensen O'Connor Johnson Kindness PLLC (57) ABSTRACT

An optical disk apparatus capable of determining the type of a loaded optical disk. In accordance with an RF signal output from a pickup, an RF processing section of the optical disk apparatus generates a focus signal (an FOK signal), which is an envelope of the RF signal, and supplies the focus signal to a DSP. In the DSP, the level of the FOK signal is compared with a threshold value, and a result of comparison is supplied to a controller. The controller determines occurrence of defocus on the basis of the comparison result. Concurrently, the controller quantitatively evaluates the level of the FOK signal by means of sequentially changing the threshold value, thereby determining the type of the optical disk on the basis of the reflectivity of the optical disk.

11 Claims, 6 Drawing Sheets

Fig. 9 PRIOR ART

OPTICAL DISK APPARATUS WHICH DETERMINES THE TYPE OF OPTICAL DISK

BACKGROUND OF THE INVENTION

1. Field of the Invention

The present invention relates to an optical disk apparatus, and more particularly, to an optical disk apparatus capable of determining the type of an optical disk.

2. Prior Art

A plurality of types of optical disks, such as a CD-ROM, a CD-R, and a CD-RW, are already on the market. Standards define the reflectivity of an optical disk, such as the reflectivity of a CD-ROM or CD-R as 70% or more and the reflectivity of a CD-RW as 30% or less. An optical disk apparatus which is loaded with an arbitrary optical disk must determine the type of an optical disk loaded and record/reproduce data by means of adjusting a gain and a rotational speed in accordance with the type of the optical disk that has been loaded.

Usually, the amount of light reflected from the optical disk is detected, and the type of the optical disk is determined in accordance with the amount of reflected light. For instance, the amount of light reflected from the optical disk is compared with a threshold value while focus is being attained. If the amount of reflected light is higher than the threshold value, the optical disk is determined to be a CD-ROM. If the amount of reflected light is lower than the threshold value, the optical disk is determined to be a CD-RW.

Figure 9:
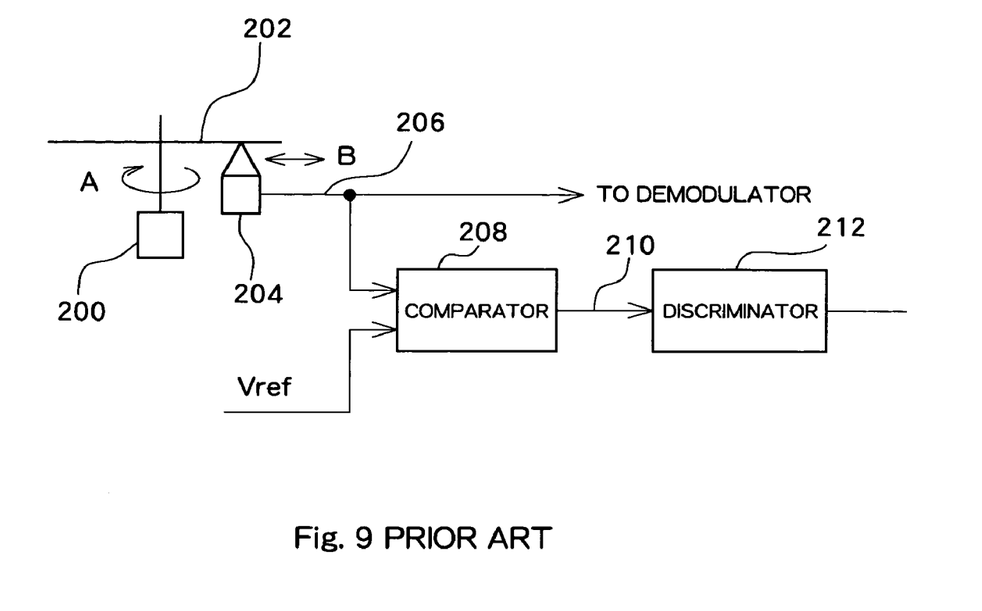
FIG. 9 is a block diagram of a conventional optical disk apparatus.

FIG. 9 shows the configuration of an optical disk apparatus equipped with discrimination function. An optical disk 202 is rotationally driven by a spindle motor 200, and reflected light is received by a pickup 204 located opposite the optical disk 202, whereupon the light is output as an RF signal 206. The RF signal 206 is output to a demodulator, where data are demodulated, and to a terminal of a comparator 208 as well. A reference voltage Vref is supplied to another terminal of the comparator 208, and a comparison result is output to a discriminator 212 as a discrimination signal 210. When focus remains attained, the discriminator 212 checks the discrimination signal 210, thereby determining whether or not the optical disk 202 is an R-LD or an LD. For further information, please refer to Japanese Patent Laid-Open Publication No. Hei 6-267181.

However, under present circumstances, optical disks are supplied from a plurality of manufacturers, and optical disks whose reflectivities fail to meet specifications are circulated in the market. For instance, CD-ROMs include CD-ROMs having a reflectivity on the order of 60% as well as standard CD-ROMs having a reflectivity of 70% or higher. In the prior art, the type of an optical disk is determined by means of a mere reflectivity. Therefore, there arises a problem of a CD-ROM having a reflectivity of 60% being erroneously determined to be a CD-RW.

If a CD-ROM is erroneously determined to be a CD-RW, an RF amplification gain and a servo gain of a reproduction system are set to those for a CD-RW. When data are read from the CD-ROM, a servo signal becomes saturated, thereby resulting in anomalous operation of the optical disk apparatus.

If the optical disk has been erroneously determined to be a CD-RW, the rotational speed will sometimes be controlled to a low speed, thereby raising a problem of a failure to reproduce data at a rotational speed unique to a CD-ROM.

According to the prior art, the type of an optical disk is determined after attainment of focus has been ascertained, and hence processing for detecting a focused state and discriminating an optical disk is required.

SUMMARY OF THE INVENTION

The present invention provides an optical disk apparatus capable of accurately determining the type of a loaded optical disk. The invention also provides an optical disk apparatus capable of recording/reproducing data through use of appropriate control parameters in accordance with the type of an optical disk, on the basis of a result of determination.

An optical disk apparatus of the invention has means for radiating a laser beam onto an optical disk; means for receiving the laser beam reflected from the optical disk and outputting a reflection signal having an intensity corresponding to the amount of reflected laser beam; and means for comparing the intensity of the reflection signal with a threshold value and detecting occurrence of defocus of the pickup when the intensity of the reflection signal is lower than the threshold value, detection of occurrence of defocus and determination of the type of the optical disk being performed by means of sequentially varying the threshold value. The amount of light reflected from the optical disk changes according to the degree of defocus and the reflectivity of the optical disk. If no defocus has arisen and a certain degree of focus has been attained, the intensity of the reflection signal comes to an output of a certain value or more. The value is determined in accordance with the reflectivity of the optical disk. A determination as to whether or not defocus has arisen can be rendered by means of comparing the intensity of the reflection signal with the threshold value. The intensity of the reflection signal can be quantitatively evaluated by means of sequentially changing the threshold value, thereby enabling determination of reflectivity of the optical disk; that is, the type of the optical disk. According to the invention, the type of the optical disk is not determined after focus is determined to have been attained. Instead, the type of the optical disk is determined by means of changing the threshold value to be used for determining occurrence of defocus. A focused state and the type of the optical disk can be determined simultaneously.

According to an embodiment of the invention, the detection means determines the optical disk as any of at least three types of disks; that is, a high-reflectivity disk, an intermediate-reflectivity disk, and a low-reflectivity disk, by means of changing the threshold value in at least two steps. The high-reflectivity disk corresponds to, e.g., a standard (conforming) CD-ROM or CD-R. The low-reflectivity disk corresponds to, e.g., a CR-RW. The intermediate-reflectivity disk corresponds to a nonconforming CD-ROM or CD-R having a midpoint between the two reflectivities (a CD-ROM or CD-R which is lower in reflectivity than the conforming CD-ROM or CD-R).

In another embodiment of the invention, a gain and a rotational speed are adjusted in accordance with a result of determination of the optical disk. Generally, in the case of a disk having a high reflectivity, the gain is finely adjusted or the disk is driven at a high rotational speed. In the case of a disk having a low reflectivity, the gain is increased considerably, or switching is effected to driving at a low rotational speed.

The invention will be more clearly comprehended by reference to the embodiment provided below. However, the scope of the invention is not limited to the embodiment.

DETAILED DESCRIPTION OF THE PREFERRED EMBODIMENT

An embodiment of the invention will be described hereinbelow by reference to the drawings.

Figure 1:
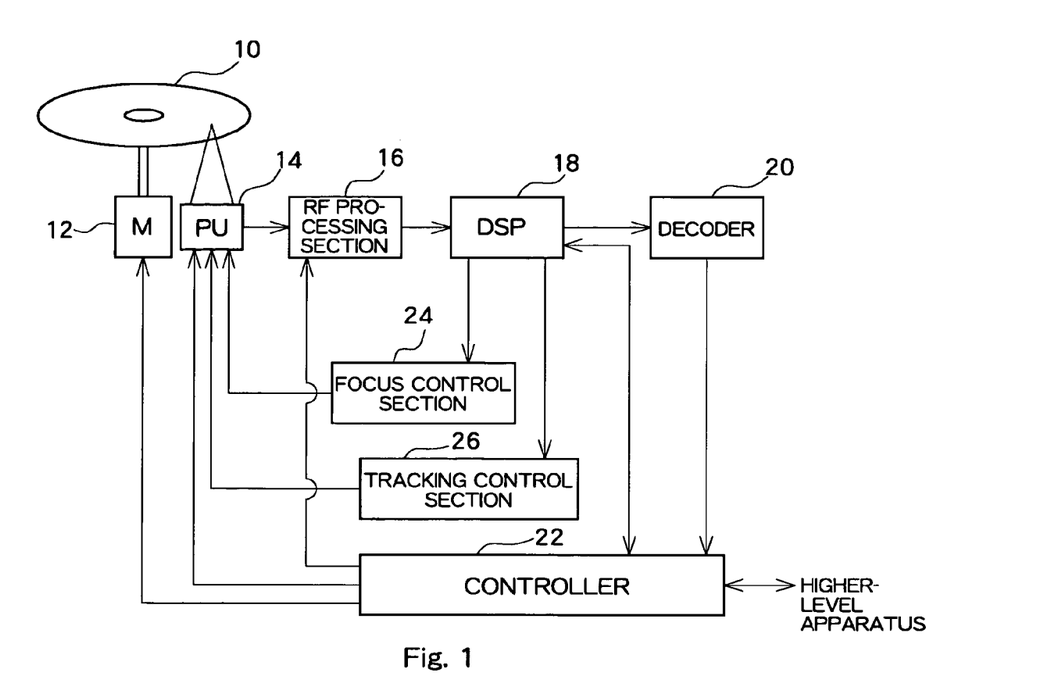
FIG. 1 is a configuration block diagram of an embodiment of the present invention.

FIG. 1 is a configuration block diagram of the embodiment. An optical disk 10 is rotationally driven by a spindle 12 at a rotational speed corresponding to the type of the optical disk 10. For instance, when the optical disk 10 corresponds to a CD-ROM, the optical disk is driven at a 24× speed. When the optical disk 10 corresponds to a CD-RW, the optical disk is driven at a 10× speed.

An optical pickup (PU) 14 is arranged opposite the optical disk 10 and comprises a laser diode (LD) for radiating a laser beam on the surface of the optical disk 10, and a photodetector. The photodetector of the optical pickup 14 outputs to an RF processing section 16 a detection signal corresponding to the amount of reflected light.

The RF processing section 16 has an RF amplifier and outputs a detection signal after having amplified the same. The RF processing section 16 generates a focus error signal and a tracking error signal and supplies the thus-generated signals to a digital signal processor (DSP) 18. The tracking error signal is produced by, e.g., a differential push-pull method. Specifically, the tracking error signal is generated from a difference between a push-pull signal of a main beam and a push-pull signal of a sub-beam. The focus error signal is generated by means of, e.g., astigmatism. The RF processing section 16 generates an FOK signal for detecting occurrence of defocus and supplies the signal to the DSP 18. The FOK signal is generated from an envelope of the detection signal.

The DSP 18 outputs, to a decoder 20, a reproduced RF signal obtained by amplifying a sum signal output from the photodetector for receiving reflected light of the main beam.

The decoder 20 has an equalizer and a binarizer. The decoder 20 binarizes a predetermined frequency of a reproduced RF signal; specifically, an amplitude of a high-band signal such as a 3T signal, through boosting operation. The thus-binarized signal is demodulated and then output to a controller 22. Demodulation is performed by means of generating a synchronous clock signal with a PLL circuit and extracting that signal.

The controller 22 outputs demodulated data output from the decoder 20 to a higher-level apparatus, such as a personal computer.

The DSP 18 supplies a focus error signal to a focus control section (driver) 24. The focus control section 24 actuates an objective lens of the pickup 14 in accordance with the focus error signal, thereby sustaining a focused state. The same also applies to tracking control operation. The DSP 18 supplies a tracking error signal to a tracking control section (driver) 26, thereby actuating the pickup 14 across a track and maintaining the pickup 14 in an on-track state. The DSP 18 determines the level of the FOK signal from the RF processing section 16, and the result of determination is supplied to the controller 22. Determination of the level of the FOK signal to be performed by the DSP 18 is effected by comparing the level of the FOK signal with a predetermined threshold value. The predetermined threshold value is sequentially changed in accordance with a command from the controller 22.

The controller 22 outputs the demodulated data output from the decoder 20 to a higher-level apparatus such as a personal computer. At the time of recording of data, data output from a higher-level apparatus are input to the controller 22, and the data are further supplied to an encoder, where the data are encoded. The laser diode provided in the pickup 14 is activated. The controller 22 receives from the DSP the result of determination of the level of the FOK signal output, to thus determine whether or not defocus has arisen. Concurrently, the controller 22 determines the type of the optical disk 10 and adjusts a servo gain, an RF amplification gain, or the like and also adjusts a rotational speed by means of controlling the spindle motor 12.

On the basis of the result of determination of the level of the FOK signal output from the DSP 18, the controller 22 determines occurrence of defocus and the type of the optical disk 10. A basic processing algorithm is as follows:

(1) A first threshold voltage is set in the register provided in the DSP 18, and the level of the FOK signal is compared with the first threshold voltage by a comparator provided in the DSP 18. A determination as to whether or not defocus has arisen and determination of the type of the optical disk are rendered, whereupon processing is completed.

(2) If the determination result of the level is negative, a second threshold voltage which is lower than the first threshold voltage is again set in the register, and the comparator is caused to compare the level of the FOK signal with the second threshold voltage.

As mentioned previously, occurrence of defocus and determination of the type of the optical disk 10 are performed by sequentially decreasing the threshold voltage from the first threshold value, the second threshold value, and a third threshold value. In the embodiment, the controller 22 identifies the optical disk 10 as at least a standard (conforming) CD-ROM or CD-R, a CD-ROM or CD-R having a low reflectivity, or a CD-RW.

In FIG. 1, the RF processing section 16 may be physically separated into an RF signal processing circuit and an error signal detection circuit. The RF signal processing circuit amplifies the sum signal output from the photodetector and outputs the signal as a reproduced RF signal to the DSP 18 and the decoder 20 after having amplified the signal. Further, the RF signal processing circuit generates an FOK signal and outputs the signal to the DSP 18. The error signal detection circuit generates, from the difference signal output from the photodetector, a focus error signal and a tracking error signal and outputs the signals to the DSP 18. In addition to producing the FOK signal, the RF signal processing circuit may generate and output an RFOK signal for detecting presence/absence of an RF signal. The RFOK signal can be generated by supplying the RF signal to a high-pass filter, to thereby cause only a high-frequency component to pass through the filter, and subjecting the high-frequency component to peak detection to generate the RFOK signal.

Figure 2:
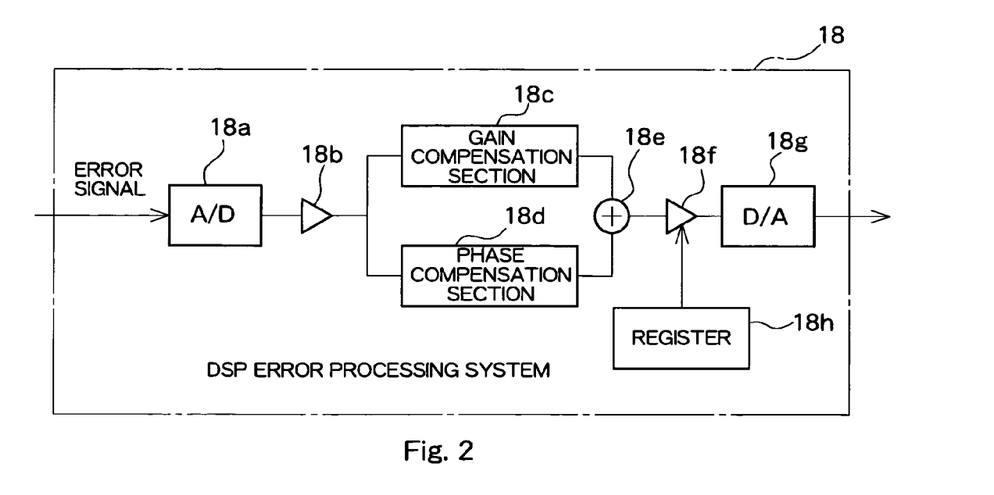
FIG. 2 is a functional block diagram of a DSP (an error processing system) shown in FIG. 1.
Figure 3:
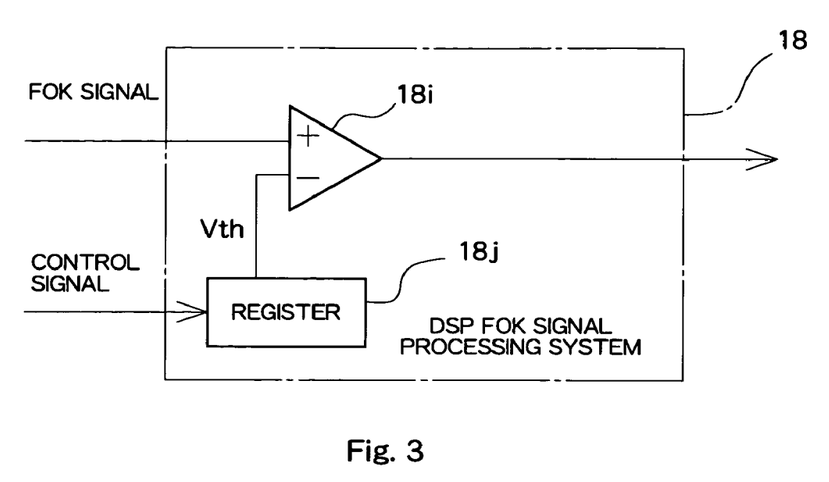
FIG. 3 is a functional block diagram of the DSP (an FOK signal system) shown in FIG. 1.

FIGS. 2 and 3 show functional block diagrams of the DSP 18. The DSP 18 is configured to comprise an error processing system for processing a tracking error signal and a focus error signal, and a focus processing system for processing an FOK signal. FIG. 2 is a functional block diagram of the error processing system of the DSP 18. FIG. 3 is a functional block diagram of the FOK signal processing system of the DSP 18.

FIG. 2 will first be described.

In FIG. 2, error signals (e.g., the tracking error signal and the focus error signal) output from the RF processing section 16 are converted into digital signals by means of an analog-to-digital converter 18a. The thus-converted signals are supplied to a gain compensation section 18c and a phase compensation section 18d after having been multiplied by a multiplier 18b. The signal that has been subjected to gain compensation by the gain compensation section 18c and the signal that has been subjected to phase compensation by the phase compensation section 18d are added together by an adder 18e. The resultant signal is again amplified by an amplifier 18f and converted into an analog signal by a digital-to-analog converter 18g. The analog signal is supplied to the focus control section 24 and the tracking control section 26.

The gain of the DSP 18 can be varied by means of changing, e.g., a multiplication factor of the multiplier 18f. Specifically, the gain can be varied by means of changing the value of a register 18h. The set value of the register 18h is determined by a control signal output from the controller 22.

FIG. 3 will now be described.

FIG. 3 is a functional block diagram of an FOK signal processing system. The FOK signal output from the RF processing section 16 is supplied to a non-inverted input terminal (+) of a comparator 18i. Meanwhile, a threshold voltage Vth is supplied to an inverted input terminal (−) of the comparator 18i. The value of the threshold value Vth is determined by setting the value of a register 18j. The value of the register 18j is set by a control signal output from the controller 22. Specifically, the controller 22 sequentially sets the threshold voltage Vth from the first threshold value, the second threshold value, and the third threshold value. Here, (the first threshold value)>(the second threshold value)>(the third threshold value).

The comparator 18i compares the FOK signal with the threshold voltage Vth, thereby outputting a binary signal which becomes high when the FOK signal is equal to or higher than the threshold voltage Vth and low when the FOK signal is lower than the threshold voltage Vth. As mentioned above, the FOK signal is an envelope signal of the detection signal (i.e., a reflection signal output from the optical disk 10), indicating the amount of reflected light. If a certain degree of focus is attained, the level of the FOK signal will assume a certain value or more and become higher than the threshold voltage Vth, whereupon the binary signal is output as a high signal. Consequently, the FOK signal is used for determining whether or not a certain degree of focus is attained; that is, whether or not defocus has arisen.

In the embodiment, if variations exist in the reflectivity of the optical disk 10 that has been loaded, the level of the FOK signal will vary in accordance with the reflectivity. Hence, the magnitude of reflectivity of the optical disk 10 is evaluated by sequentially changing the threshold voltage Vth to be used for determining whether or not focus is attained. Specifically, the level of reflected light is determined not after attainment of focus has been determined, but by varying the threshold value to be used for determining whether or not focus has been attained. Therefore, in the present embodiment, a determination as to whether or not focus remains attained and determination of the type of the optical disk 10 can be performed simultaneously.

Figure 4:
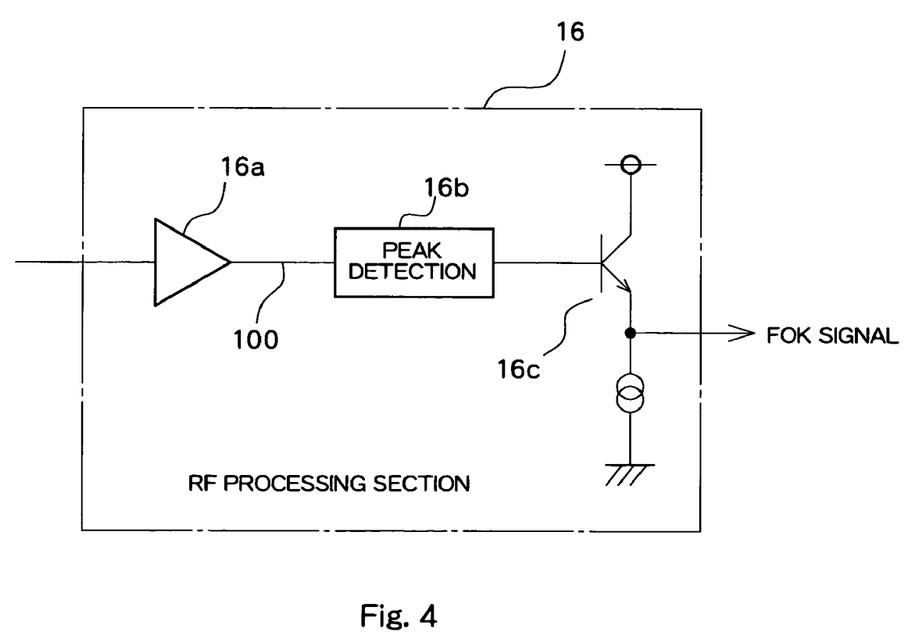
FIG. 4 is a circuit diagram of an RF processing section shown in FIG. 1.

FIG. 4 shows a circuit diagram of an FOK signal generation section provided in the RF processing section 16. After having been amplified by an amplifier 16a, the reflection signal output from the pickup 14 is fed to a peak detection circuit 16b. The peak detection circuit 16b detects a peak of the reflection signal and supplies the thus-detected peak to the base of a transistor 16c. The collector of the transistor 16c is connected to a power source, and the emitter of the same is connected to a constant current source. An output appearing at the emitter is output as an FOK signal.

Figure 5:
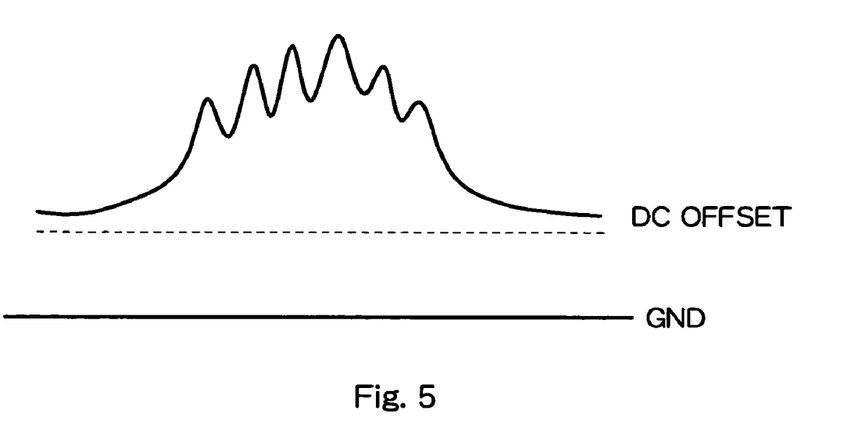
FIG. 5 is an RF signal waveform descriptive view.

FIG. 5 shows a signal 100 in FIG. 4; that is, the reflection signal amplified by an amplifier 16a. A DC offset of the reflection signal changes according to an optical disk apparatus and assumes a value of, e.g., 1.3 volts. The reflection signal is output so as to be superimposed on the DC offset. The DC offset specifies the lower limit of the threshold voltage Vth required when the FOK signal is binarized.

Figure 6:
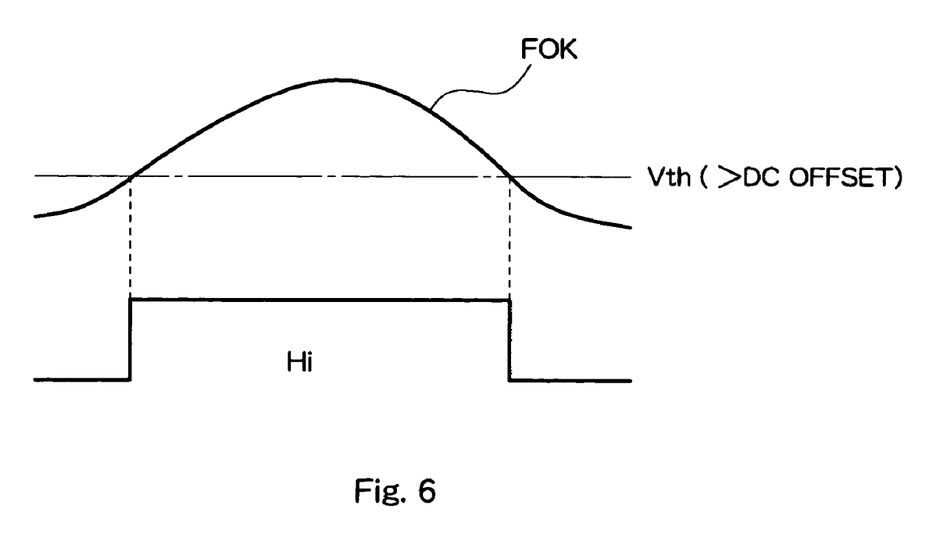
FIG. 6 is an FOK signal waveform descriptive view.

FIG. 6 shows an FOK signal output from the emitter of the transistor 16c. The comparator 18i provided in the DSP 18 compares the FOK signal with the threshold voltage Vth, and the FOK signal is then converted into a binary signal. The threshold voltage Vth is for evaluating the level of the FOK signal; that is, the level of reflectivity of the optical disk 10, and varies in a plurality of steps within a range satisfying Vth≧(DC offset). For instance, 1.95 volts and 1.75 volts are sequentially set as the value of the threshold voltage Vth, and the FOK signal is compared with the threshold voltage Vth. If the FOK signal≧1.95 volts, the comparator 18i outputs a high signal, and the signal is then supplied to the controller 22. Therefore, the controller 22 can be determined not to be defocused, and the optical disk 10 can be determined to have a high reflectivity and be a standard (conforming) CD-ROM or CD-R.

When the FOK signal is lower than 1.95 volts, the comparator 18i outputs a low signal, and the signal is supplied to the controller 22. The controller 22 can determine the optical disk 10 not to be a standard CD-ROM or CD-R. In this case, the controller 22 changes the value of the threshold voltage Vth from 1.95 volts to 1.75 volts in order to determine the optical disk 10. If the FOK signal≧1.75 volts, the comparator 18i outputs the high signal, and the signal is supplied to the controller 22. Therefore, the controller 22 can determine that defocus has not arisen. The controller 22 also determines that the optical disk 10 has a reflectivity which is lower than that of the standard CD-ROM or CD-R but not as low as the reflectivity of the CD-RW. In short, the controller 22 can determine the optical disk 10 to be a CD-ROM or CD-R having a low reflectivity.

As mentioned above, the CD-ROM or CD-R having a low reflectivity can be determined by changing, in at least two steps, the threshold voltage Vth to be used for binarizing the FOK signal. If defocus has arisen, the high signal will not be output even when the threshold voltage Vth is changed, and hence the low signal remains output.

Rather than being changed in two steps, the threshold voltage Vth can be changed in more than two steps.

Figure 7:
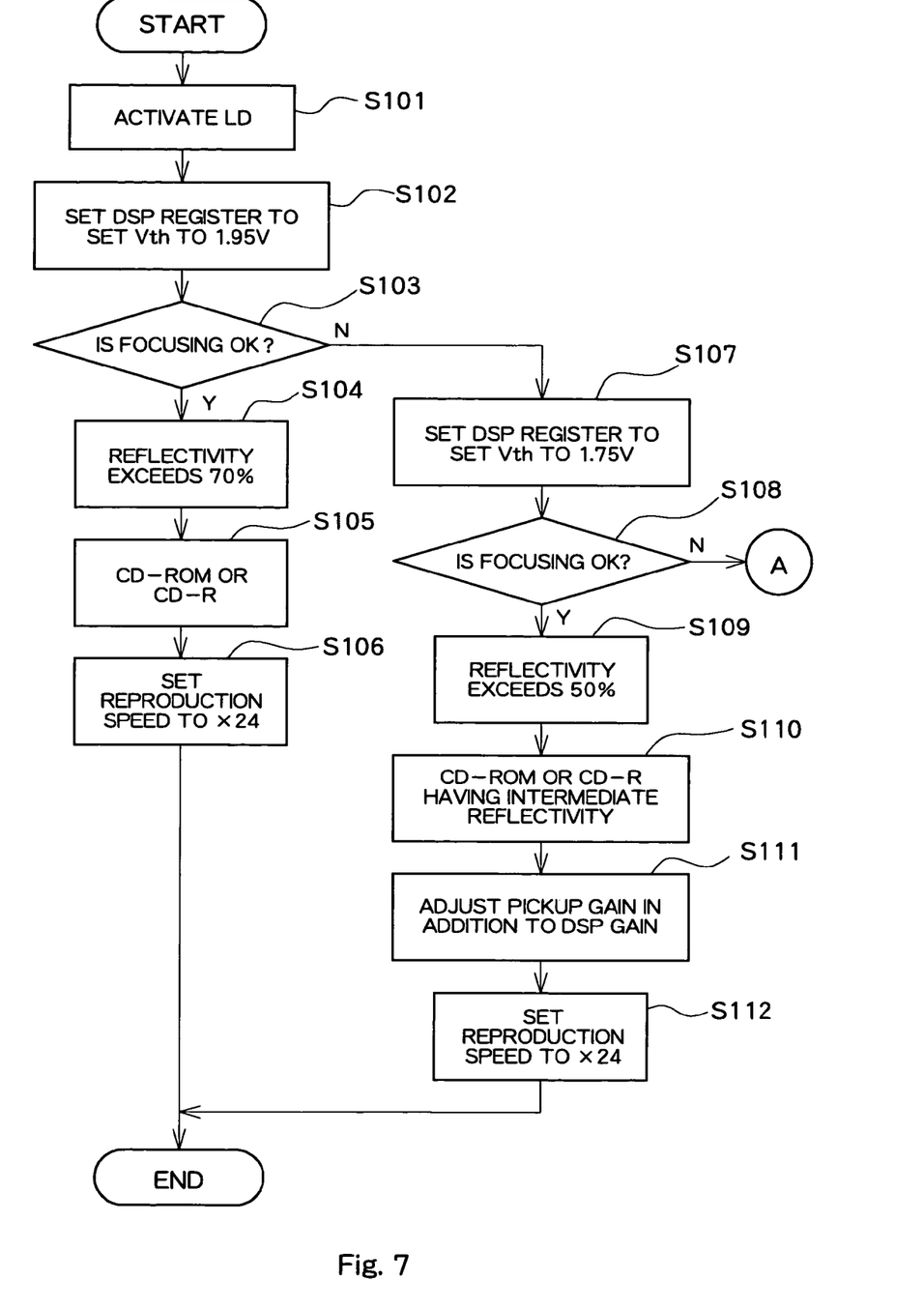
FIG. 7 is an overall processing flow chart (part 1) of the embodiment.
Figure 8:
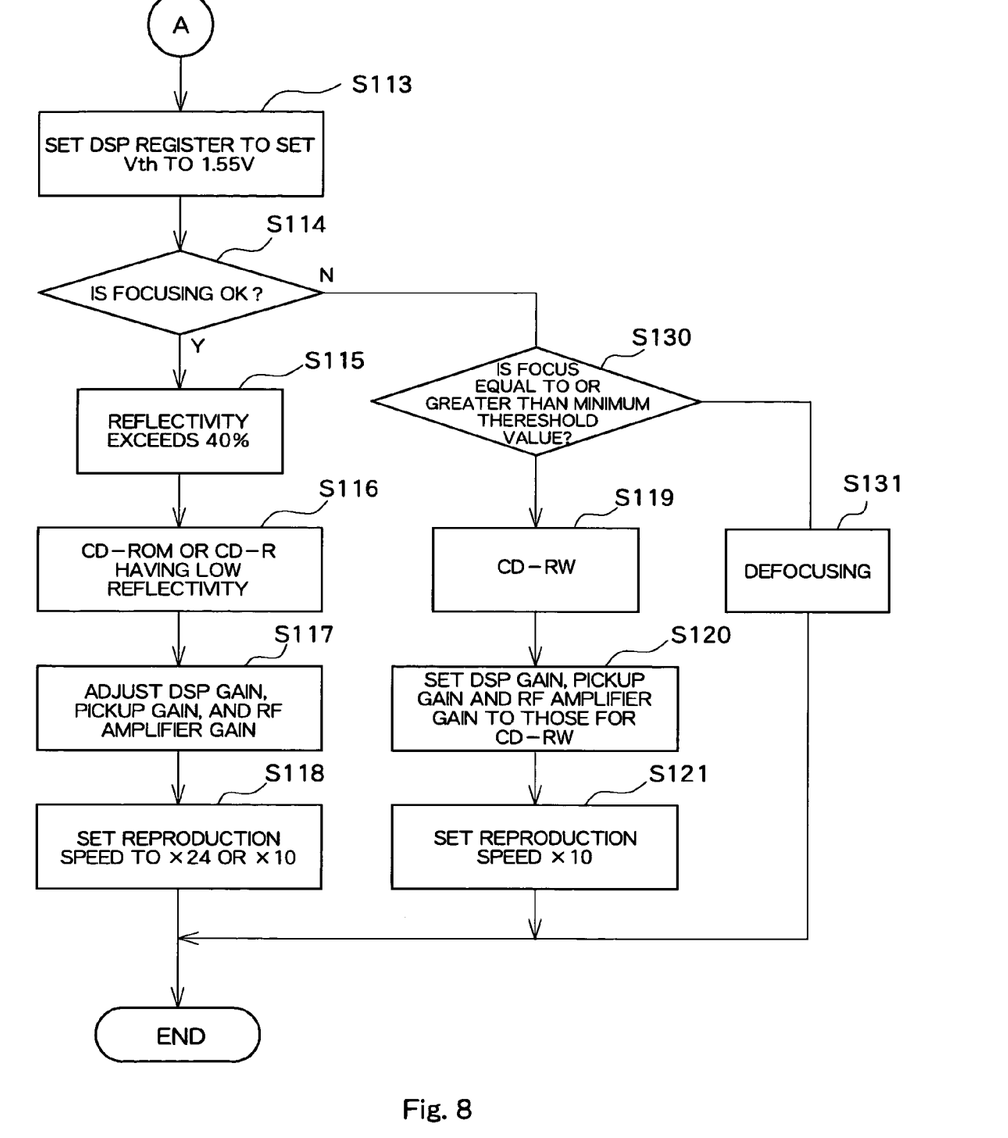
FIG. 8 is an overall processing flow chart (part 2) of the embodiment.

FIGS. 7 and 8 show a processing flowchart of the embodiment. First, the laser diode (LD) provided in the pickup 14 is activated (S101), thereby radiating a laser beam of reproduction power onto the optical disk 10. Next, the value of the register 18j provided in the DSP 18 is set, thereby setting the threshold value Vth to be used for evaluating the level of the FOK signal to an initial value of 1.95 volts (S102). In this state, the reflection signal output from the pickup 14 is supplied to the RF processing section 16, and the RF processing section 16 outputs to the DSP 18 the focus error signal, the tracking error signal, the FOK signal, and the reproduced RF signal.

The DSP 18 compares the FOK signal with the Vth=1.95 volts and supplies the result of comparison to the controller 22. The controller 22 determines whether or not the binary signal output from the DSP 18 is high; that is, whether or not the FOK signal assumes a threshold voltage Vth of 1.95 volts or more. When the FOK signal assumes a threshold voltage Vth of 1.95 volts or more, focus can be determined to be achieved; that is, no defocus can be determined to be attained (S103). The reflectivity of the optical disk 10 can be determined to exceed 70% (S104), and the type of the optical disk 10 is determined to be a standard (conforming) CD-ROM or CD-R (S105). Mere comparison of the FOK signal with the threshold voltage Vth enables simultaneous determination of occurrence of no defocus and the type of the optical disk 10.

After having determined the type of the optical disk 10, the controller 22 adjusts a gain and a rotational speed in accordance with the type of the optical disk 10. When the optical disk 10 is a conforming CD-ROM or CD-R, the controller 22 processes the reproduction signal by means of adjusting solely a servo gain of the DSP 18 and also outputs a control signal to the spindle motor 12, thereby setting the rotational speed to a 24× speed (S106).

In contrast, when NO is selected in step S103; that is, when the level of the FOK signal is determined to be lower than Vth=1.95 volts, the controller 22 again sets the register 18j of the DSP 18, thereby decreasing the threshold voltage Vth from 1.95 volts to 1.75 volts (S107). After having set the threshold voltage Vth to 1.75 volts, the controller 22 again determines whether or not a binary signal output from the DSP 18 is high; that is, whether or not the level of the FOK signal is equal to or higher than a threshold value of 1.75 volts. When the FOK signal is equal to or higher than a threshold voltage of 1.75 volts, no defocus can be determined to have arisen (S108). The reflectivity of the optical disk is determined to exceed a value of 50% (S109), and the optical disk 10 is determined to be a CD-ROM or CD-R having an intermediate reflectivity (S110).

When the type of the optical disk 10 is determined to be a CD-ROM or CD-R having an intermediate reflectivity, the controller 22 then adjusts a gain or a rotational speed corresponding to the type of the optical disk 10. In this case, in addition to adjusting the gain of the DSP 18, the controller 22 adjusts the gain of the pickup 14, to thus increase the gain level (S111). After adjustment of the gain, the controller 22 supplies a control signal to the spindle motor 12, thereby setting the reproduction speed to 24× to enable reproduction of data (S112). Since the gain has been adjusted in step S111, the CD-ROM or CD-R having an intermediate reflectivity can also be subjected to 24× reproduction, as in the case of the standard CD-ROM or CD-R.

When NO is selected in step S108; that is, when the level of the FOK signal is lower than a Vth of 1.75 volts, processing proceeds to that shown in FIG. 8.

During the processing shown in FIG. 8, the value of the register 18j provided in the DSP 18 is set, thereby setting the threshold voltage Vth to be used for evaluating the level of the FOK signal from 1.75 volts to 1.55 volts (S113). In this state, the reflection signal output from the pickup 14 is supplied to the RF processing section 16, and the RF processing section 16 outputs to the DSP 18 the focus error signal, the tracking error signal, the FOK signal, and the reproduced RF signal. In the DSP 18, the FOK signal is compared with a threshold value of 1.55 volts, and the result of comparison is supplied to the controller 22. The controller 22 determines whether or not the binary signal output from the DSP 18 is high; that is, whether or not the FOK signal assumes a threshold value of 1.55 volts or more. When the FOK signal assumes a threshold value Vth of 1.55 volts or higher, focus can be determined to be attained; that is, occurrence of no defocus can be determined (S114). The reflectivity of the optical disk 10 can be determined to exceed 40% (S115), and the type of the optical disk 10 is determined to be a CD-ROM or CD-R having a low reflectivity (S116).

After having determined the type of the optical disk 10, the controller 22 adjusts the gain and the rotational speed in accordance with the type of the optical disk 10. When the optical disk 10 is a CD-ROM or CD-R having a low reflectivity, the controller 22 also adjusts the gain of the pickup 14, to thus process the reproduction signal, in addition to adjusting the servo gain of the DSP 18 and the gain of the RF amplifier (S117). Moreover, the control signal is output to the spindle motor 12, whereby the rotational speed of the spindle motor 12 is set to 24× or 10× speed (S118). The rotational speed is set to a 10× speed in consideration of the inability to reproduce data by means of only gain adjustment.

When NO is determined to be selected in step S114; that is, when the level of the FOK signal is determined to be lower than a threshold voltage of 1.55 volts, the controller 22 determines the type of the optical disk 10 as a CD-RW having a reflectivity of 30% or less (S119). The gain of the DSP 18, the gain of the RF amplifier, and the gain of the pickup 14 are set to those for a CD-RW (S120). The rotational speed is adjusted to a 10× speed for a CD-RW by means of controlling the spindle motor 12 (S121). Before the optical disk 10 is determined to be a CD-RW in S119, the controller 22 may again set the register 18j of the DSP 18 to decrease the threshold voltage Vth from 1.55 volts to the minimum threshold value (i.e., a level slightly higher than the DC offset); e.g., 1.40 volts, thereby ascertaining that the binary signal output from the comparator 18i becomes high. This determination processing is indicated by S130 in FIG. 8. When the binary signal output from the comparator 18i still remains low, occurrence of defocus or absence of a disk is determined (S131).

Table 1 provides a summary of gain adjustments and rotational speeds (nX) corresponding to the types of the optical disk 10.

TABLE 1

| | DSP GAIN | PICKUP GAIN | AMPLIFICATION GAIN | ROTATIONAL SPEED |
|---|---|---|---|---|
| STANDARD CD-ROM/R | ◯ | X | X | 24 |
| CD-ROM/R HAVING INTERMEDIATE REFLECTIVITY | ◯ | ◯ | X | 24 |
| CD-ROM/R HAVING LOW REFLECTIVITY | ◯ | ◯ | ◯ | 24/10 |
| CD-RW | ◯ | ◯ | ◯ | 10 |

In Table 1, the degree of gain adjustment increases in sequence of DSP gain≦pickup gain≦RF amplification gain. An attempt is made to finely adjust the gain through use of the DSP gain. When fine adjustment of the gain has ended in failure, the gain is further adjusted in conjunction with adjustment of the pickup gain. If the gain cannot be adjusted by means of the DSP gain and the pickup gain, the gain is further adjusted along with the RF amplification gain. Thus, the optical disks 10 having various reflectivities can be handled.

The rotational speed of the CD-ROM or CD-R having a low reflectivity (i.e., 24×/10×) shows a decrease in rotational speed from 24× to 10× when the gain adjustment does not suffice. Recording/reproduction of data at the highest-possible speed is desirable for the user. Even in the case of a CD-ROM or CD-R having a low reflectivity, the rotational speed is not always reduced. The rotational speed is reduced after all gains have been adjusted, thereby addressing the user's request.

What is claimed is:

1. An optical disk apparatus comprising:
   means for radiating a laser beam onto an optical disk;
   means for receiving said laser beam reflected from said optical disk and outputting a reflection signal having an intensity corresponding to the amount of reflected laser beam; and
   means for comparing the intensity of said reflection signal with a threshold value and detecting occurrence of defocus of said pickup when the intensity of said reflection signal is lower than said threshold value, detection of occurrence of defocus and determination of the type of said optical disk being performed by means of sequentially varying said threshold value.

2. The apparatus according to claim 1, wherein said detection means determines said optical disk to be any of at least three types of disks; that is, a high-reflectivity disk, an intermediate-reflectivity disk, and a low-reflectivity disk, by means of changing said threshold value in at least two steps.

3. The apparatus according to claim 1, wherein said detection means determines said optical disk to be any of at least three types of disks; that is, a standard CD-ROM or CD-R, a low-reflectivity CD-ROM or CD-R, or a CD-RW, by means of changing said threshold value in at least two steps.

4. The apparatus according to claim 1, further comprising gain adjustment means for adjusting a gain of said reflection signal in accordance with the type of said optical disk determined by said detection means.

5. The apparatus according to claim 4, wherein
   said pickup has first amplification means for adjusting a gain of said reflection signal; and further comprising second amplification means for adjusting a gain of said reflection signal output from said pickup, wherein said adjustment means adjusts a gain of said reflection signal by means of adjusting a gain of at least any of said first amplification means and said second amplification means in accordance with the type of said optical disk determined by said detection means.

6. The apparatus according to claim 1, further comprising:
   speed adjustment means for adjusting the rotational speed of said optical disk in accordance with the type of said optical disk determined by said detection means.

7. The apparatus according to claim 1, wherein
   said detection means sequentially changes said threshold value from a first threshold value, a second threshold value, a third threshold value, and a fourth threshold value (here, said first threshold value>said second threshold value>said third threshold value>said fourth threshold value) in order to detect occurrence of no defocus and determine said optical disk to be a standard CD-ROM or CD-R when the intensity of said reflection signal is equal to or higher than said first threshold value; to detect occurrence of no defocus and determine said optical disk to be an intermediate-reflectivity CD-ROM or CD-R when the intensity of said reflection signal is equal to or higher than said second threshold value but smaller than said first threshold value; to detect occurrence of no defocus and determine said optical disk to be a low-reflectivity CD-ROM or CD-R when the intensity of said reflection signal is equal to or higher than said third threshold value but smaller than said second threshold value; to detect occurrence of no defocus and determine said optical disk to be a CD-RW when the intensity of said reflection signal is equal to or higher than said fourth threshold value but smaller than said third threshold value; and to detect occurrence of defocus when the intensity of said reflection signal is equal to or lower than said fourth threshold value.

8. An optical disk apparatus, comprising:
   a pickup for receiving light reflected from an optical disk and outputting a reflection signal corresponding to the amount of reflected light;
   an RF processing circuit which amplifies said reflection signal output from said pickup and outputs an envelope signal of said reflection signal as a focus signal;
   a processor which detects occurrence of defocus by means of sequentially comparing said focus signal output from said RF processing circuit with a plurality of threshold values and determines the type of said optical disk as at least any of a CD-ROM or CD-R, a low-reflectivity CD-ROM or CD-R, or a CD-RW; and
   a controller for adjusting a gain of said pickup, a gain of said RF processing circuit, and a gain of a focus servo circuit in accordance with a result of determination.

9. The apparatus according to claim 8, wherein said controller adjusts a rotational speed of said optical disk in accordance with said result of determination in addition to said gains.

10. The apparatus according to claim 8, wherein said processor comprises
    a comparator for sequentially comparing said focus signal with a plurality of said threshold values and outputting a binarized signal; and
    a register for sequentially supplying a plurality of said threshold values to said comparator.

11. The apparatus according to claim 8, wherein a plurality of said threshold values are set as values which are greater than a DC offset of said focus signal.

* * * * *